United States Patent Office 2,745,457
Patented May 15, 1956

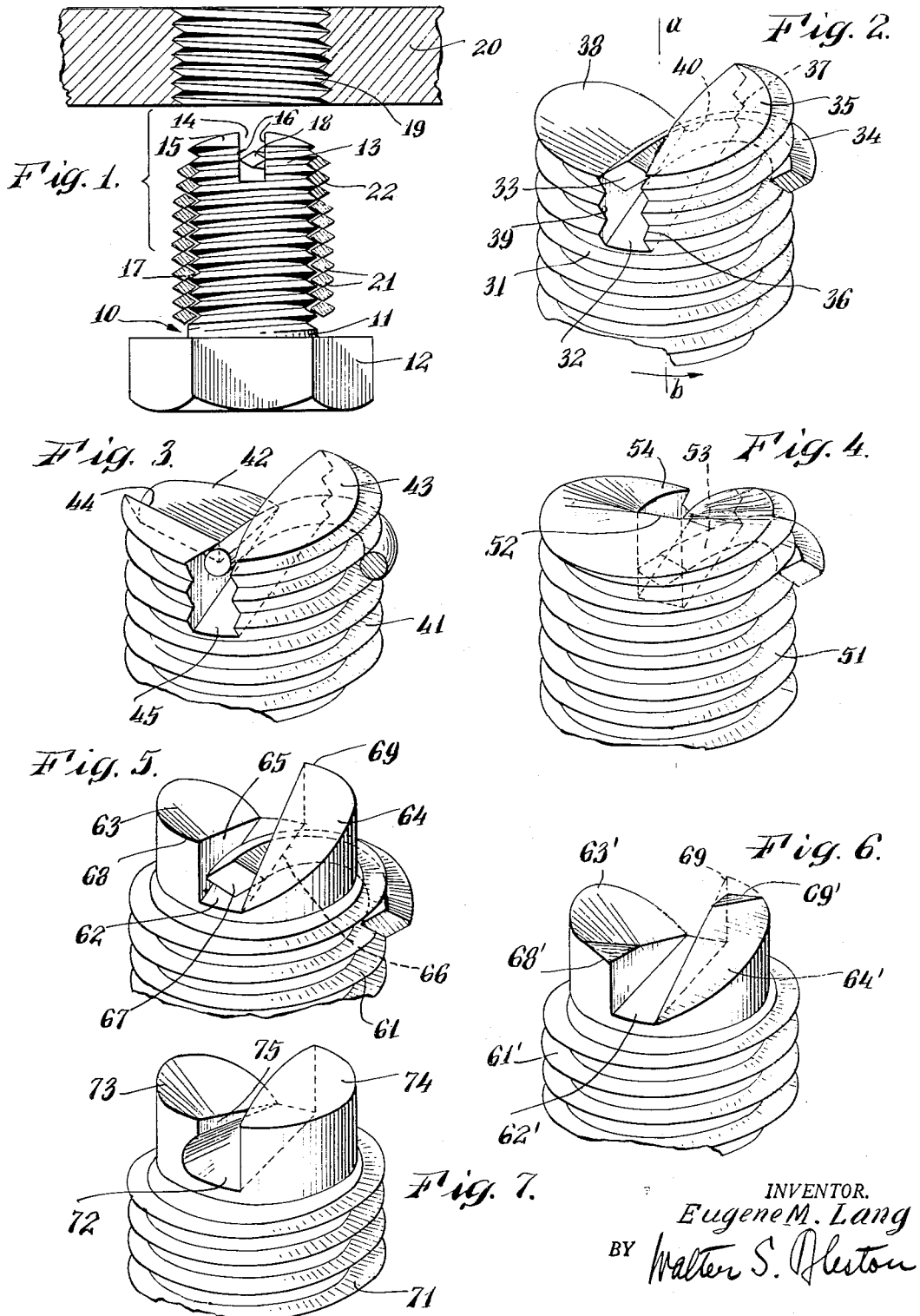

2,745,457

WIRE COIL BOLT LOCK

Eugene M. Lang, Danbury, Conn., assignor to Heli-Coil Corporation, Danbury, Conn., a corporation of Delaware Application August 19, 1952, Serial No. 305,117

4 Claims. (Cl. 151—14)

The present invention relates to a screw bolt having locking features in connection with a wire coil screw thread insert in a boss or nut member.

Wire coil inserts of the type here under consideration are frequently used to form a thread for a screw bolt or stud in a boss member.

The invention aims to provide means whereby a bolt may be locked with respect to such wire thread insert be it that the latter is readily removable from the boss, be it that it inherently possesses or is provided with locking features ensuring a greater or lesser resistance to its removal.

Screw thread wire coils of the conventional type are provided with a diametrically directed tang of one of its ends convolutions which for the purpose of inserting the coil can be gripped by a tool from the interior of the coil to apply a torque for screwing the coil into the tapped hole of a boss. After the insertion the tang is usually broken off by the inserting tool or another tool before a bolt is screwed into the thread forming coil.

The invention aims to provide a bolt with an end so shaped that it can engage the tang of a screw thread insert in a manner similar to a conventional inserting tool, thereby rendering the latter unnecessary; that, however, upon a reversal of the torque originally applied for inserting the bolt with the insert, the insert will be locked in the boss and the bolt will be locked to the insert. In another form of the invention, the locking feature is aimed to be such that the bolt releasing the tang can be screwed out of the coil in the boss, when the reversing torque reaches a predetermined value.

Further objects and details of the invention will be apparent from the description given hereinafter and the accompanying drawing illustrating several embodiments thereof by way of example.

In the drawing:

Fig. 1 is a perspective view partly in section of a screw bolt with a wire coil screw thread insert thereon in position to be screwed into a tapped hole.

Figs. 2 to 7 are perspective views of different forms of bolt ends shaped according to the invention.

Referring now to the drawing in Fig. 1, a screw bolt 10 comprises the shank 11 and the head end 12 which may be of any suitable form as e. g., the illustrated hexagon shape, for the application of a torque. The shank is provided with the conventional external thread 13 and with an axial slot 14 in its free end 15. For a reason to be explained hereinafter, it is advisable to round off the corners 16 of the slot. A screw thread wire coil 17 of any desired cross-section, shown in the illustrated embodiment as diamond shaped, engages the thread 13 of the bolt 10, and its one end forming a diametrical tang 18 engages the slot 14. The combination of the bolt and coil can be produced in various ways e. g., by first inserting the end of a piece of wire in the slot 14 and, then, coiling the wire, while its end is held in the slot, into the thread convolutions 13 of the bolt shank 11, or by producing a coil with a tangentially extending end, screwing the coil on the shank and, then, bending the end into engagement with the slot 14, or by another suitable process. The bolt 10 with the coil 17 thereon may now be screwed into the tapped threading 19 of a boss member 20.

When the bolt is in position it is automatically locked. If a torque would be applied to screw the bolt out of the coil or the tapped hole, first of all the tang 18 engaging in slot 14 prevents the bolt from separating from the coil. Since the corners 16 are rounded as stated hereinbefore the danger of the tang being cut off or sheared off by a sharp edge upon a reversal of the torque is minimized. When, now the torque is transmitted through the bolt to the tang and the adjacent convolution, the latter will be spread to seat firmly in the tapped thread 19 of the boss 20 so much so that the friction between the coil and the thread will prevent any movement of the one relatively to the other. This locking effect can be insured by winding the coil in general slightly wider than the diameter of the bolt thread as shown at 21 and only the one or two convolutions 22 adjacent the tang so as to fit the bolt thread. Thereby it will be attained that the convolutions which lead when the bolt with the coil is screwed in, can readily enter the tapped hole. The wider convolutions will then be contracted as they are screwed in and will spring so as to seat from the start firmly in the boss thread 19 when the inserting torque is released. On the other hand their frictional resistance will furnish the additional reaction to a torque in the opposite direction whereby the spreading of the convolutions 22 will be insured. Thus after the insertion of the bolt 10 the screw connection between the boss 20, the coil 13 and the bolt 10 is inseparable except by destruction of at least one of the parts.

In the embodiments of Figs. 2 to 7 a similar locking principle prevails to that in Fig. 1 with the difference, however, that the bolt after having been inserted together with the coil, can be removed from the latter by a reversing torque of a smaller or greater value. In Figs. 2 to 7 merely the recessed ends of bolts or studs are shown each with a portion of the tang-provided end convolution of a wire thread coil. In order to indicate, that the invention is applicable to wire cross-sections of any desired shape, a round rather than a diamond-shaped wire cross-section is shown in Fig. 3.

In the embodiment of Fig. 2, the exteriorly threaded bolt or stud end 31 is provided with an axial slot 32 in which the tang 33 of the coil end convolution 34 engages. The end face 35 on the one side of the slot is flat, i. e. substantially at right angles to the bolt axis a. In other words the slot edges 36 and 37 extending from face 35 towards the bottoms of the slot 32 are of equal length. It is to be noted, that edge 37 is the one which is located in the bend between the convolution 34 and the tang 33. Thus the bolt portion including the face 35 lies also between the convolution 34 and the tang 33 when the coil is applied to the bolt. The opposite portion of the bolt, i. e. the portion on the other side of the slot is relieved so that the end face 38 is inclined substantially from the level of the face 35 near edge 39 opposite edge 36 down to the bottom or near the bottom of the slot at 40, i. e. opposite the edge 37. The face 38 may be plane or curved depending on the desired effect as it will be explained hereinafter.

Now it will be clear, that a tang-provided coil may be attached to the bolt of Fig. 2 in the same manner as in Fig. 1 that means in the position of coil 34 with tang 33. In this relative position the coil with the bolt end therein may be screwed in the direction of the arrow b into a tapped hole, the slot flanks near the edges 37 and 39 transmitting the torque from the bolt to the coil without any relative movement of these members to one another. If, however, after the insertion of the bolt and coil, a reversing torque is applied to the bolt, the flanks of the slot will tend to take the tang along thereby causing the adjacent convolution and even consecutive convolutions to spread until the frictional resistance renders any movement of the coil relatively to the boss into which it is screwed impossible. When further torque is applied the free end of the tang will still be confined between the flanks of the slot, but the other tang end near its bend will tend to climb the inclined face 38 while simultaneously the bolt tends to withdraw in its axial direction from the tang owing to its helical path in the coil 34. Thereby, the tang will be deformed until it finally snaps out of the slot and the bolt can be screwed out of the coil without any other resistance than the ordinary friction between the thread convolutions. Once the bolt has been removed, the coil can also be removed from the tapped hole with a conventional extracting tool.

It will be clear that the amount of torque required to unscrew the bolt will depend on the extent to which the tang has to be deformed until it finally separates from the bolt. This deformation can be controlled by the degree of relief and the ratio of the relief of the face 38 to the depth of the slot. The depth of the slot, in turn, will have to be selected in consideration of the shape of the wire and the pitch of the coil. The best form of the face 38, depth of the slot, and other features will be readily found by trial to cause a desired holding or unscrewing torque within admissible limits. In most instances, it will be advisable to provide for a holding torque insufficient to cause a permanent deformation of the tang or adjacent coil convolution; in other words the elastic limit of the coil material should not be exceeded.

In the modification of Fig. 3 the shape of the bolt end 41 is similar to that of Fig. 2 with the difference, however, that in this case the end face 42 is stepped at 44. This step may either be parallel to the bolt axis or may be inclined but at a much steeper angle than the face 42. The step should be so formed that it constitutes a positive stop for the tang after the latter has escaped the slot 45. In this embodiment, the tang riding on the inclined face 42 and then bearing against the step 44 until finally escaped from the slot upon the application of an unscrewing torque, will be deformed similarly to the tang in Fig. 2 and will also create a certain amount of distortion between the tang-provided convolution and the remainder of the coil, whereby a locking action is caused not only by deformation of the tang but by a difference in pitch.

Fig. 4 shows a bolt structure 51 similar to Fig. 2 in which, however, only a partial slot 52 for a short tang 53 is provided. The inclined face portion 54 serves the same purpose as face 33 in Fig. 2.

In the forms according to Figs. 2 to 4 it is necessary first to remove the bolt and, then, also the insert coil if it it is desired to replace a bolt for any reason. The removal of the coil is required because a bolt of the type of Figs. 2 and 3 can be screwed into a tapped hole only after the insert has been coiled into the bolt.

The embodiments of Figs. 5 to 7 have locking properties similar to those of Fig. 2. In addition, the bolts are so formed that they can be screwed into a tang-provided coil after the latter has been inserted into a tapped hole. For this purpose the bolt 61 is provided with an axial slot 62 between bolt portions having oppositely inclined end faces 63 and 64 so that the slot is flanked by two triangular side walls 65 and 66 having right angles at the opposite ends of the slot 62. When now a bolt formed with its end according to Fig. 5 is screwed into a tang-provided coil inserted in a tapped hole, the raised portions of the inclined faces 63 and 64 will first come to bear on tang 67. When their inclination and the height of the flanks 65 and 66 are correctly chosen, the tang will be slightly deformed when the bolt is further screwed in until the bolt projection containing the faces 64 and 66 can slide between the tang and the adjacent convolution so that the tang will snap into locking position in the slot 62 as shown in Fig. 5. When the torque on the bolt is reversed, the inclined faces 63 and 64 will act on the tang in a similar manner to that described with respect to face 38 in Fig. 2. In the form of Fig. 5 the faces 63 and 64 may be helically curved with a pitch differing from that of the thread of the bolt.

However, in screwing a bolt according to Fig. 5 into an insert, be it that from the start the insert and the bolt have to be applied the one after the other, or be it that the bolt had been removed from the assembly and is to be reassembled, it may happen that one of the projecting tips 68 or 69 grabs the tang and moves the insert forward in the hole or else prevents the tang and slot from coming into most effective re-engagement for locking purposes. Such happening can be prevented by relieving the highest points 68 and 69 of the faces 63 and 64, respectively, as illustrated in Fig. 6, where the relief faces are shown at 68' and 69' the original tip 69 being indicated in dotted lines. These relief faces which may either be plane or curved and which are substantially inclined in directions opposite to those of the faces 63 and 64 will ease the tang forward so that it will snap into the slot 62.

In many instances, it is desirable to position the tang in the slot more exactly with respect to its depth during the insertion. For this purpose, the flank of the slot against which the free end of the tang comes to bear during insertion may be undercut as shown in Fig. 7. In that figure the slot 72 of the bolt 71 may be formed substantially as shown in Fig. 5 or 6, i. e. between the oppositely inclined end faces 73 and 74. The slot flank 75 on the side of the face 73 is so undercut that the tang end engaging the flank 75 during the insertion of the bolt will be urged downward so as to bear firmly on the bottom of the slot 72. In all other respects the form of Fig. 7 is similar to that of Fig. 5. However, it will be clear that the tips 78 and 79 may be relieved in the manner shown in Fig. 6 with respect to the tips 68 and 69.

It will be noted that in Figs. 1 to 4 the bolts are threaded to their ultimate end, whereas in Figs. 5 to 7 the bolt ends approximately as far as the slot bottoms are not threaded. As to the operation of the bolt lock, it is immaterial which of the two forms is selected in each case.

It will be apparent to those skilled in the art that many alterations and modifications of the structures shown and described are possible without departure from the essence and spirit of the invention which for that reason shall not be limited but by the scope of the appended claims.

I claim:

1. A lock bolt comprising in combination a bolt and an inner and outer screw thread forming wire coil insert for a tapped hole, said bolt having a head formed for the application of a torque and a shank portion having a free end opposite said head, said shank portion being provided with an outer screw thread screwed into the inner screw thread formed by said insert, said free end being provided with an axial slot having flanking walls parallel to each other and to the axis of said bolt, said slot forming two end projections of said shank each of which having an end face inclined substantially from the bottom of the slot at the opposite ends thereof, respectively, and rising towards the ultimate end of said projections in the same sense as the thread of said bolt, said wire coil including at its one end a diametrical tang located in said slot, said end faces being so inclined as to allow said tang to ride thereon but to be deformed thereby before leaving said slot when a torque tending to reverse said bolt in said insert exceeds a predetermined value.

2. A lock bolt as claimed in claim 1 the angle of inclination of said faces being slightly larger than the pitch angle of said thread, and the maximum depth of said slot being such that the deformation of the tang displaced by said faces from its normal position during the removal of the shank is within the elastic limits of the coil material.

3. A lock bolt as claimed in claim 1, said inclined faces being helically curved.

4. A lock bolt as claimed in claim 1 wherein the tips of said projections are relieved so as to form faces substantially inclined in directions opposite to those of said inclined faces.

References Cited in the file of this patent

UNITED STATES PATENTS

| | | |
|---|---|---|
| 526,308 | Garvin | Sept. 18, 1894 |
| 1,093,434 | Kent | Apr. 14, 1914 |
| 1,361,922 | Stirling | Dec. 14, 1920 |
| 1,816,591 | Kirby | July 28, 1931 |
| 1,842,741 | Bengtsson | Jan. 26, 1932 |
| 2,210,061 | Caminez | Aug. 6, 1940 |
| 2,360,047 | Caminez | Oct. 10, 1944 |
| 2,520,232 | Bereza | Aug. 29, 1950 |